United States Patent [19]

Rea, Jr. et al.

[11] Patent Number: 5,027,367
[45] Date of Patent: Jun. 25, 1991

[54] SINGLE-FREQUENCY MONOLITHIC NONPLANAR RING LASER AND METHOD FOR DETERMINING SAME

[75] Inventors: Edward C. Rea, Jr.; Alan C. Nilsson, both of Stanford, Calif.

[73] Assignee: The Board of Trustees of the Leland Stanford Junior University, Stanford, Calif.

[21] Appl. No.: 332,010

[22] Filed: Mar. 31, 1989

[51] Int. Cl.$^5$ .............................................. H01S 3/083
[52] U.S. Cl. ........................................ 372/94; 372/37
[58] Field of Search .................................... 372/94, 37

Primary Examiner—William L. Sikes
Assistant Examiner—Robert E. Wise
Attorney, Agent, or Firm—Flehr, Hohbach, Test, Albritton & Herbert

[57] ABSTRACT

A monolithic Nd:glass nonplanar ring laser and method for determining optimal nonplanar ring oscillator geometry for a monolithic nonplanar ring oscillator, including an arrangement for determining for a given material of a specific index of refraction and an accompanying angle of incidence the most suitable geometry for creating a monolithic nonplanar ring oscillator out of said material to produce unidirectional operation with simultaneous high differential loss and lowest overall loss. The index of refraction and angle of incidence being within a predefined range. The geometries include four, five and six bounce monolithic nonplanar ring oscillators.

25 Claims, 7 Drawing Sheets

SINGLE-FREQUENCY MONOLITHIC NONPLANAR RING LASER AND METHOD FOR DETERMINING SAME

This invention is related to the invention disclosed in U.S. patent application Ser. No. 332,232, filed on Mar. 31, 1989 and concurrently herewith, entitled MONOLITHIC NONPLANAR RING OSCILLATOR AND METHOD, invented by Alan C. Nilsson and Robert L. Byer, attorney docket no. A-49531/JAS/-SJA which is hereby incorporated by reference.

BACKGROUND OF THE INVENTION

1. Field of the Invention

The present invention relates to monolithic nonplanar ring oscillators (NPROs). More specifically, the present invention relates to designating the optimal geometry for a monolithic NPRO given the index of refraction and Verdet constant of a designated medium. Even more specifically, the present invention relates to optimal geometries for monolithic NPROs in materials having index of refraction greater than approximately 1.47.

2. Summary of the Prior Art

The prior art has presented the advantages of end-pumped monolithic nonplanar ring oscillators (NPROs). In general, monolithic nonplanar ring oscillators can operate as unidirectional, single-frequency lasers in the presence of a sufficiently strong magnetic field. End-pumping of the monolithic NPRO provides an efficient means of exciting only the TEM$_{00}$ mode of the laser, and end-pumping greatly reduces the thermal load on the laser. End-pumping with diode laser sources is particularly efficient. A monolithic laser has a rugged, mechanically stable resonator. Unidirectional oscillation in a ring laser overcomes the problem of spatial hole burning and allows the laser to operate in a single longitudinal mode, even at high output powers. Unidirectional operation of a ring laser also leads to improved resistance to optical feedback. An end-pumped, unidirectional, monolithic NPRO is thus an efficient source of narrow linewidth laser radiation with improved immunity to the deleterious effects of back-reflected radiation.

All devices of the prior art have used Nd:YAG or Nd:GGG as the laser medium. It is desirable to extend the concept of the monolithic NPRO to other media, especially laser glasses. There are several strong motivations for doing so, including improved injection locking of highpower pulsed glass laser systems, the engineering of laser resonators with extremely low quantum linewidth limits, and the potential of developing monolithic resonators with small thermo-optic coefficients. Any glass-based system requiring a narrow linewidth stable oscillator would benefit from the development of a monolithic NPRO in laser glass.

There are also considerable practical advantages to using laser glass for making monolithic NPROs. First, the optical quality of laser glass can be superior to that of most crystalline materials. Second, the cost of high quality laser glass is small compared to that of high quality laser crystals. Third, specialized manufacturing techniques have been developed for use with glass which cannot usually be applied to crystalline media. These practical and physical considerations make the development of a design for monolithic NPROs constructed from media of widely varying indices of refraction extremely important.

U.S. Pat. No. 4,578,793, issued Mar. 25, 1986 to Kane and Byer, entitled Solid-State Non-Planar Internally Reflecting Ring Laser, describes the requirements for unidirectional oscillation in a monolithic nonplanar ring oscillator. The fundamental requirement is an adequate loss difference between the two possible directions of propagation around the ring. The laser will operate unidirectional in the direction of lower loss when the loss difference is sufficiently large. To produce a difference between the round trip losses of the two directions of propagation requires an optical diode. The three essential elements required to form an optical diode are: 1) a reciprocal (propagation-direction-independent) polarization effect, 2) a nonreciprocal (propagation-direction-dependent) polarization effect, and 3) a partial polarizer.

Discrete-element Faraday effect optical diodes have long been used to enforce stable unidirectional operation of solid-state, He-Ne, and ring dye lasers. The optical diode creates a polarization-dependent difference in loss for the eigenmodes of the two directions of propagation around a ring. The loss difference is produced by a combination of a reciprocal polarization rotator such as c-axis quartz, a nonreciprocal rotator such as a Faraday rotator, and a polarizer. Ideally, one arranges the reciprocal and nonreciprocal rotations to cancel for one direction of propagation and to add for the other. In the direction in which the rotations cancel, the eigenpolarizations are the low and high loss linear polarization states aligned with the principal axes of the partial polarizer. For the direction in which the rotations add, the eigenpolarizations are in general linear or elliptical polarization states with losses intermediate between the maximum and minimum possible values. An optical diode having these properties is said to be optimal.

Kane and Byer describe a means of producing an optical diode in a monolithic nonplanar ring oscillator. The elements of the optical diode are as follows. The reciprocal polarization-influencing effect is provided by a nonplanar ring light path defined by three total internal reflections (TIRs) and one reflection from a multilayer dielectric-coated output coupler. The nonreciprocal effect is provided by Faraday rotation in the laser medium when the laser resonator is immersed in an applied magnetic field. Oblique reflection from the output coupler implies that the p (in-plane) and s (perpendicular) reflection coefficients for the output coupler are different, so the output coupler functions as a partial polarizer.

Figure 1A:
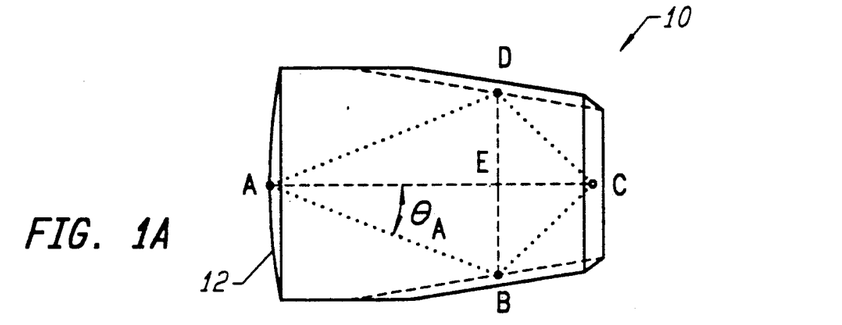
FIGS. 1a-b illustrates a monolithic 4-reflection NPRO of the prior art.
Figure 1B:
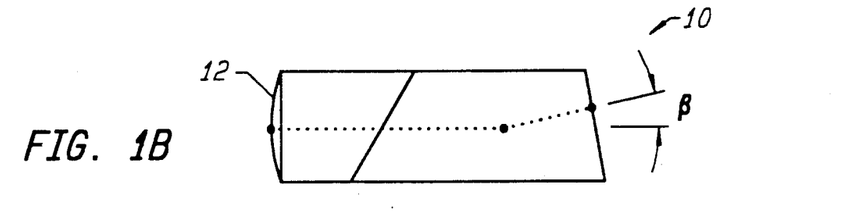

Referring to FIGS. 1a-b, a schematic of the nonplanar ring light path for a prior art four-reflection NPRO 10 is shown. The light path is the perimeter of a three-dimensional geometric figure formed by joining two isosceles triangles (ABD and BCD) along a common base (BD). The dihedral angle between the two planes of the triangles is denoted by $\beta$ (FIG. 1b). For any value of $\beta$ other than 0 or 180 degrees, the light path is nonplanar. The light path has a plane of reflection symmetry (ACE). A uniform magnetic field B is applied parallel to AE.

The preferred embodiment of Kane and Byer involved a nonplanar ring light path in Nd:YAG in which the two planes of propagation (planes ABD and BCD in FIG. 1) of the light meet at right angles ($\beta=90$ degrees). Trutna et al., in U.S. Pat. No. 4,747,111 for a Quasi-Planar Monolithic Unidirectional Ring Laser has shown that a significant advantage accrues from a change in the geometry of the light path. In the preferred embodiment of Trutna et al. the two planes of propagation of the light in Nd:YAG meet at an angle of $\beta = 1.25$ degrees instead of 90 degrees. The advantage of this geometry is that the associated optical diode is more closely analogous to the ideal discrete-element optical diode described previously. The loss associated with the low-loss direction of propagation is made as small as is permitted by the choice of the output coupler 12. Moreover, the loss difference between the two directions of propagation for similar-sized NPROs in the presence of a given applied magnetic field is much larger for the quasi-planar case than for the right-angle case. In other words, the quasi-planar design permits unidirectional oscillation induced by a much smaller magnetic field than for the right-angle geometry.

As noted earlier, prior art devices have used high-index-of-refraction, crystalline laser materials such as Nd:YAG (n=1.82) or Nd:GGG (n=1.94) as the medium for their monolithic resonator. All devices of the prior art have used four-reflection nonplanar ring light paths comprising three TIRs and a single reflection from the output coupler. Some of the relative advantages of different geometries for the nonplanar ring light path have been considered. It has been shown that significant advantages accrue to devices in which the combination of the geometry of the light path and the applied magnetic field lead to an optical diode that best emulates the ideal discrete-element optical diode in producing a low loss for the oscillating direction and a high loss for the non-oscillating direction.

The prior art descriptions of diode-laser-pumped monolithic glass lasers have, additionally, envisioned four-reflection monolithic Nd:Glass NPRO with a right-angle light path geometry. It is illustrated by implication of the analysis herein that such an NPRO cannot operate optimally as envisioned. Moreover, it has been experimentally shown that four-reflection, monolithic Nd:glass NPROs fail to run unidirectionally, even using large magnetic fields. These experimental results underscore the importance of paying careful attention to the optical diode properties of the monolithic NPRO.

SUMMARY OF THE INVENTION

Accordingly, it is an objective of the present invention to provide an improved monolithic NPRO capable of efficiently producing single-frequency unidirectional ring laser oscillation in a material characterized by an index of refraction which is less than the square root of 3.

It is another object of the present invention to provide a monolithic NPRO that operates at a relatively low applied magnetic field compared to that of the prior art.

It is another object of the present invention to provide the appropriate geometry to obtain a monolithic NPRO, given the index of refraction and Verdet constant of a specified solid laser host material.

It is another object of the present invention to provide the appropriate geometry and range of angles of incidence in an NPRO given the index of refraction of significant optical materials.

The attainment of these and related objects may be achieved through use of the novel apparatus and method for determining optimal nonplanar ring oscillator geometry herein disclosed. An apparatus and method for determining an optimal nonplanar ring oscillator geometry in accordance with this invention has an arrangement for a monolithic nonplanar ring oscillator, including a method for determining for a given material of a specific index of refraction and an accompanying angle of incidence the most suitable geometry for creating a monolithic nonplanar ring oscillator out of said material to produce unidirectional operation with simultaneously high differential loss and lowest overall loss, the index of refraction and angle of incidence being within a predefined range. The usable geometries including four, five and six bounce monolithic nonplanar ring oscillators having a symmetric open ring path.

The attainment of the foregoing and related objects, advantages and features of the invention should be more readily apparent to those skilled in the art, after review of the following more detailed description of the invention, taken together with the drawings, in which:

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Referring again to FIGS. 1a and b, the light path within a symmetric NPRO containing a total of four bounces is fully determined by four degrees of freedom. As discussed in cross referenced U.S. patent application, Ser. No. 332,232, filed Mar. 31, 1989 for a MONOLITHIC NONPLANAR RING OSCILLATOR ND METHOD, these degrees of freedom can be specified by two characteristic lengths and two angles. FIGS. 1a and 1b establish the nomenclature used to describe the basic geometry of the light path (indicated by dotted lines) as well as outlining the faceted block of laser material which defines this path. The characteristic lengths chosen correspond to the heights of the two isosceles triangles which define the primary planes of the optical path (labeled as lengths AE and CE). The preferred angles are the angle of incidence at reflection point A on the outcoupler 22, $\theta_A$, and the nonplanar bend angle $\beta$.

Figure 3A:
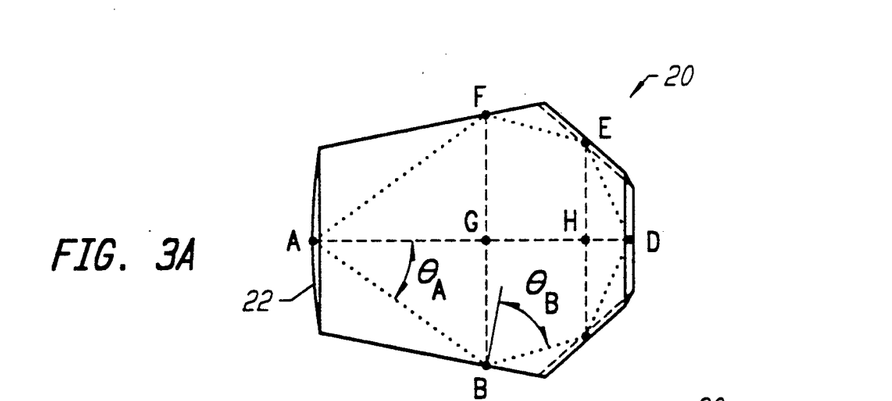
FIGS. 3a-b illustrates a six-reflection NPRO with nonplanar fold angles $\beta$, analogous to the four-reflection NPRO of the prior art.
Figure 3B:
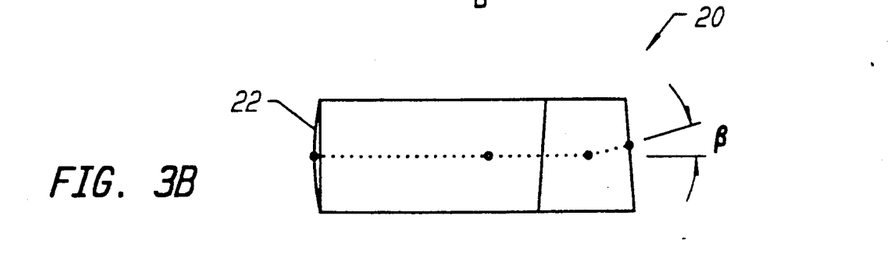

Referring to FIGS. 3a and b, the basic optical layout of an analogous 6-bounce NPRO is shown. In this geometry six degrees of freedom are required to uniquely determine the shape of the optical path. This situation also readily lends itself to a definition of the path in terms of a set of several independent characteristic lengths and angles. Three lengths are particularly appropriate, again including the two isosceles triangle heights and, in addition, their base separation (lengths AG, HD, and GH, respectively). The angles chosen include the nonplanar bend angle $\beta$ along with any two internal angles of incidence. For simplicity the in-plane angles $\theta_A$ and $\theta_B$ prove to be especially useful since these angles also represent the angles of incidence at their respective points of reflection, A and B.

The magnitude of the geometric rotation of a nonplanar light path bounded by a discrete series of reflections is simply equal to the sum of the included angles between successive planes of incidence. In both the 4-bounce 10 and 6-bounce design 20 a set of four incident planes are involved. In each case only a single point is displaced from the plane defined by the angle of incidence at the outcoupler 12 or 22. In the 4-bounce case reflection points A, B, and D as well as the intermediate point E are coplanar, only reflection point C is displaced from the primary plane. In the 6-bounce NPRO every labeled point except for D lies within the primary plane.

The geometric rotation in both the 4 and 6 bounce NPROs is a nonlinear function of the bend angle $\beta$. Comparing optimal designs in NPROs of each type which share the same value of $\theta_A$ and also have equal bend angles, the magnitude of the geometric rotation will in general be larger in the 6-bounce case. However, note that image rotation is confined to a shorter relative length segment of the resonator in the 6-bounce design. An important consequence of this feature is that the value of $\beta$ associated with an optimal design will be larger and less sensitive to fabrication errors than in the analogous 4-bounce case.

The Faraday rotations available from common laser hosts are not large. The material figure-of-merit for Faraday rotation is the Verdet constant, V; for Nd:YAG the value of V is $\sim 1.8 \times 10^{-3}$ rad/mm-Tesla. The Verdet constant of typical laser glasses is approximately one-half as large. Assuming that device dimensions are restricted by the small mode-volume requirements of low-power diode-laser pumping (i.e., the overall effective length projection parallel to the magnetic field is given by $L_{eff} \approx 1$ cm) and that magnetic field strengths B are limited to values provided by small rare-earth permanent magnet assemblies ($B \approx 0.5$ T), practical Faraday rotations will be given by $V \cdot B \cdot L_{eff} < 1°$.

This limitation obviously provides motivation for reducing the net geometric rotation by making the out-of-plane fold angle of an NPRO much lower than the right-angle bend used in the original design of Kane and Byer. However, the maximum loss difference would not in fact be obtained by simply equating the magnitudes of the geometric and Faraday rotations. An additional and non-negligible influence on the net polarization state of light propagating around the ring must be considered: the relative phase shift between orthogonal polarization components due to the TIR bounces.

Unlike the multi-layer dielectric coating on the input/output facet of an NPRO, TIR surfaces do not exhibit a polarization-dependent reflectivity at oblique incidence. In the ideal case of scatter-free, perfectly finished surfaces, each polarization component is reflected equally and completely. However, the phase shifts which occur on reflection of these same components are not necessarily equal. Both the absolute values of the phase shifts and their difference are functions of the relative refractive index of the material, n, and vary systematically with the angle of incidence. The differential phase shift represents a net phase retardance between orthogonal polarization states, exactly analogous to the behavior of a simple waveplate. Therefore the successive TIR bounces within the NPRO emulate a set of waveplates whose retardances are determined by their respective incident angles.

Figure 2:
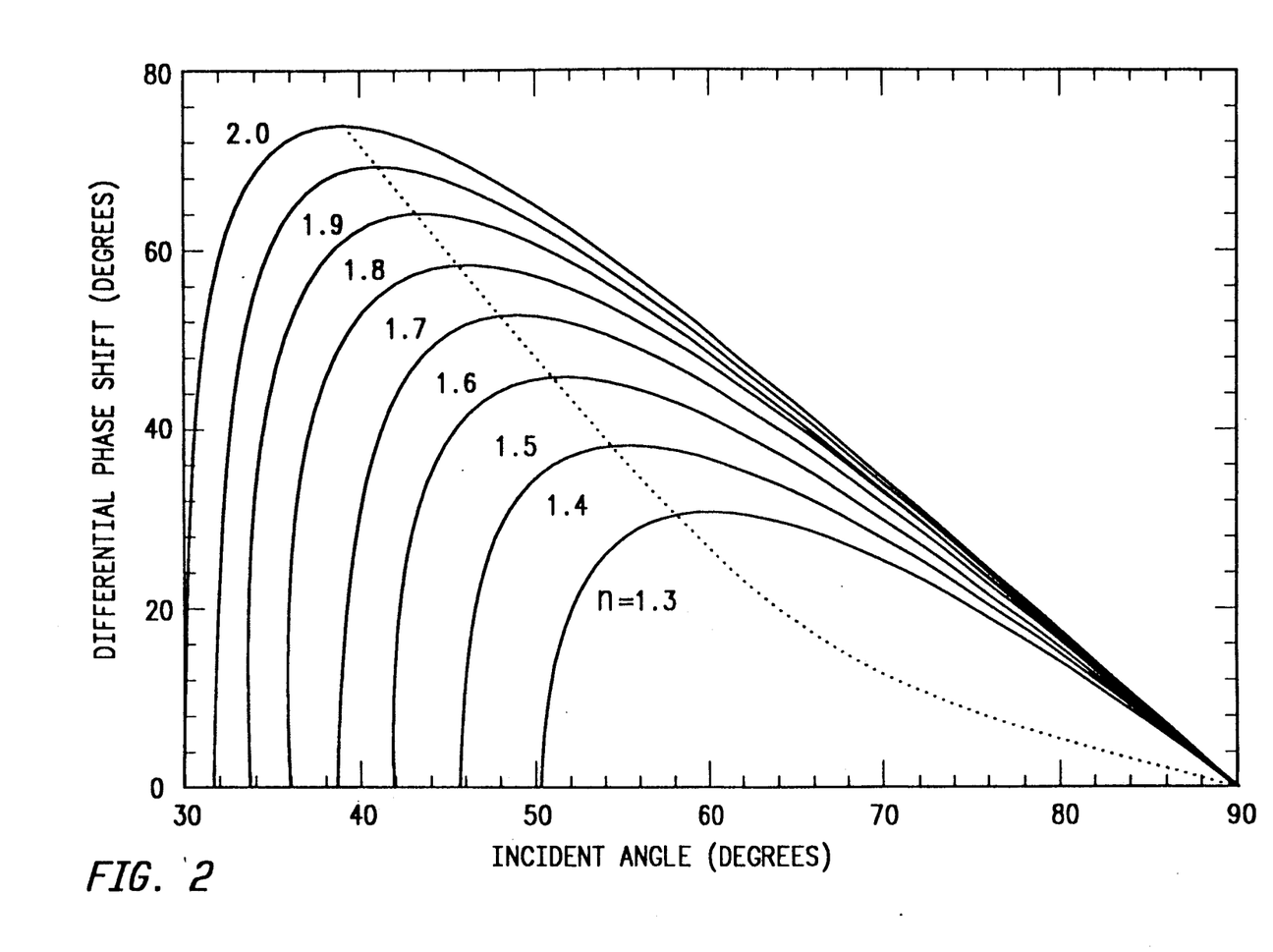
FIG. 2 illustrates the differential phase shift ($\phi_p - \phi_s$) for total internal reflection as a function of incident angle for several refractive indices.

FIG. 2 illustrates the variation with incident internal angle in the differential phase shift, $\Delta\phi(n)$, for $1.3 \leq n \leq 2.0$. The set of refractive indices indicated here spans the range associated with most common optical materials. The phase conventions assumed in generating these curves are consistent with those recommended by Bennett and Bennett $\Delta\phi \equiv \phi_p - \phi_s$. For a given value of n, $\Delta\phi(n)$ rises rapidly from zero at the critical angle to a relatively broad peak. Following each maximum, the differential phase shift decays smoothly back to zero as the individual phase shifts become equal at grazing incidence. The dotted line in FIG. 1 tracks these peak values and indicates the progression of successive maxima with n.

The retardance of each virtual waveplate can be determined with the assistance of this plot or, when greater precision is necessary, from the exact analytical expressions used to generate these curves. Since the TIRs are distributed at discrete locations within the ring and both reciprocal and nonreciprocal rotation occur between each successive virtual plate, the problem of analyzing the resultant polarization properties of the complete ring is nontrivial.

OPTIMAL DESIGNS

Ignoring details of specific resonator geometries, the characteristics which distinguish "optimal" designs can be described in fairly simple terms. Optimal designs can be defined as those which provide the maximum possible loss difference between the two different propagation directions around the ring resonator while simultaneously minimizing the losses associated with the preferred oscillation direction.

In the low-outcoupling regime consistent with diodelaser pumping, this condition is satisfied when the lower loss eigenstate of one direction becomes linearly polarized and is aligned with the higher-reflectivity principal axis of the outcoupler. In this case lasing in the lowest-loss state will be associated with the minimum outcoupling available through a particular coating and will therefore provide the lowest possible lasing threshold power permitted by that coating. The corresponding lower-loss eigenstate of the opposite direction of propagation will also be linear or very nearly linear, but is found instead to be rotated by approximately 45° from the principal axes defined by the plane of incidence.

The optical equivalents of the two possible propagation directions around the ring for optimal designs correspond to a pair of half-wave plates (or, more precisely, slightly different waveplates with retardances which are very close to 180°). The waveplate corresponding to the lowest-loss eigenstate will be exactly aligned with the high reflectivity axis of the outcoupler. The other waveplate will be slightly misaligned with respect to this axis, providing a net effective polarization rotation of twice the offset angle per round trip.

It should again be emphasized that the eigenstate of the non-preferred propagation direction in such a system does not in general align itself with one of the axes of the misaligned waveplate. The eigenstate instead approximately splits the difference between the primary axes of the partial polarizer at a critical magnetic field strength value which maximizes the differential loss.

Two different but equally valid viewpoints can be considered when discussing the design features required to provide near-optimal behavior in an NPRO. The first can be obtained by examining the non-linear variation in the loss difference as a function of applied magnetic field strength. In the case of a fixed optimal design geometry, a peak value of loss difference will occur for a unique value of B. For low-outcoupling cases, the magnitude of this difference effectively equals the mean of the difference between the maximum and minimum reflectances of the output coupler at the actual angle of incidence In more general terms it can be stated that there is a critical value of the $V.B.L_{eff}$ product required to achieve the optimal loss difference possible for a specific outcoupler in geometries which satisfy the differential phase shift constraint. If the magnitude of the Faraday rotation represented by this product exceeds the critical value, the lower-loss eigenstate tends to become progressively less linear and more elliptical. The maximum loss difference will then tend to be found at $V.B.L_{eff}$ product values which are somewhat greater than the design condition. The output polarization state associated with the maximum loss difference will then also be elliptical rather than linear.

Conversely, an alternative point-of-view is obtained by considering the situation in which the $V.B.1_{eff}$ product is restricted to a specific value. This corresponds to the typical situation confronting a designer who intends to use a particular laser host material (fixed n and V) while overall device dimensions are limited by other considerations, and who is further required to assume a fixed magnetic field strength. In this case the partial polarizer strength p provides the independent variable necessary for the specification of an optimal design. There will be a unique value of p which provides the appropriate optical equivalents which characterize optimal designs.

In any nontrivial case, computer optimization will be necessary to determine the actual amount of nonplanarity required to match the available Faraday rotation. It is interesting to note that the geometric rotation which accompanies an optimal design is in general significantly greater than the Faraday rotation. This reemphasizes the fact that the net reciprocal rotation is a complicated function of both the geometry and the TIR phase shifts and is not simply equal to the net geometric rotation.

A combination of geometric and optical constraints limit the choices of allowed internal reflection angles if the NPRO design is to satisfy this definition of an optimal case. Obviously the incident angles at the intended TIR bounces must always exceed the critical angle, $\theta_{critical} = \sin^{-1}(1/n)$, so that closure of the ring path is maintained. Conversely, the internal angle of incidence at the coated outcoupling face must in general be less than $\theta_{critical}$.

Perhaps the single most important result from the Jones calculus analysis of NPROs is that for standard quarter-wave stack outcouplers the sum of the differential phase shifts between orthogonal s and p polarization states produced by the TIR bounces must slightly exceed 180°. This amount of TIR phase shift cannot be accumulated in only 3 TIRs with laser materials characterized by an index of refraction which is less than $(3)^{\frac{1}{2}}$.

This conclusion can be verified using FIG. 2 by noting that this differential phase constraint is equivalent to requiring 60° of retardance per TIR in 3 bounces; the refractive index which exhibits this peak value clearly falls between n=1.7 and n=1.8 and in fact occurs at an incident angle of 45° where n=1.732. Since the refractive indices of laser glasses are typically smaller than this limit, alternative strategies which can satisfy this key phase-shift constraint must be considered. The strategy chosen here was to increase the total number of TIR bounces.

GENERAL DESIGN PROCEDURES

Optimal designs are identified herein as those which provide the optical equivalent of a pair of half-wave plates, one aligned with the high reflectivity state for the output coupler 32 and one slightly misaligned. Due to the limited degree of Faraday rotation available in typical laser media, the geometric rotations and associated deviation from planarity consistent with this behavior are small. The detailed specification of a resonator geometry which provides optical equivalents close to the optimal specification in a monolithic structure with a single reflection from a multi-layer dielectric coating and multiple TIRs is a complicated issue subject to a number of constraints.

OPTICAL ANGLE CONSIDERATIONS

Figure 4:
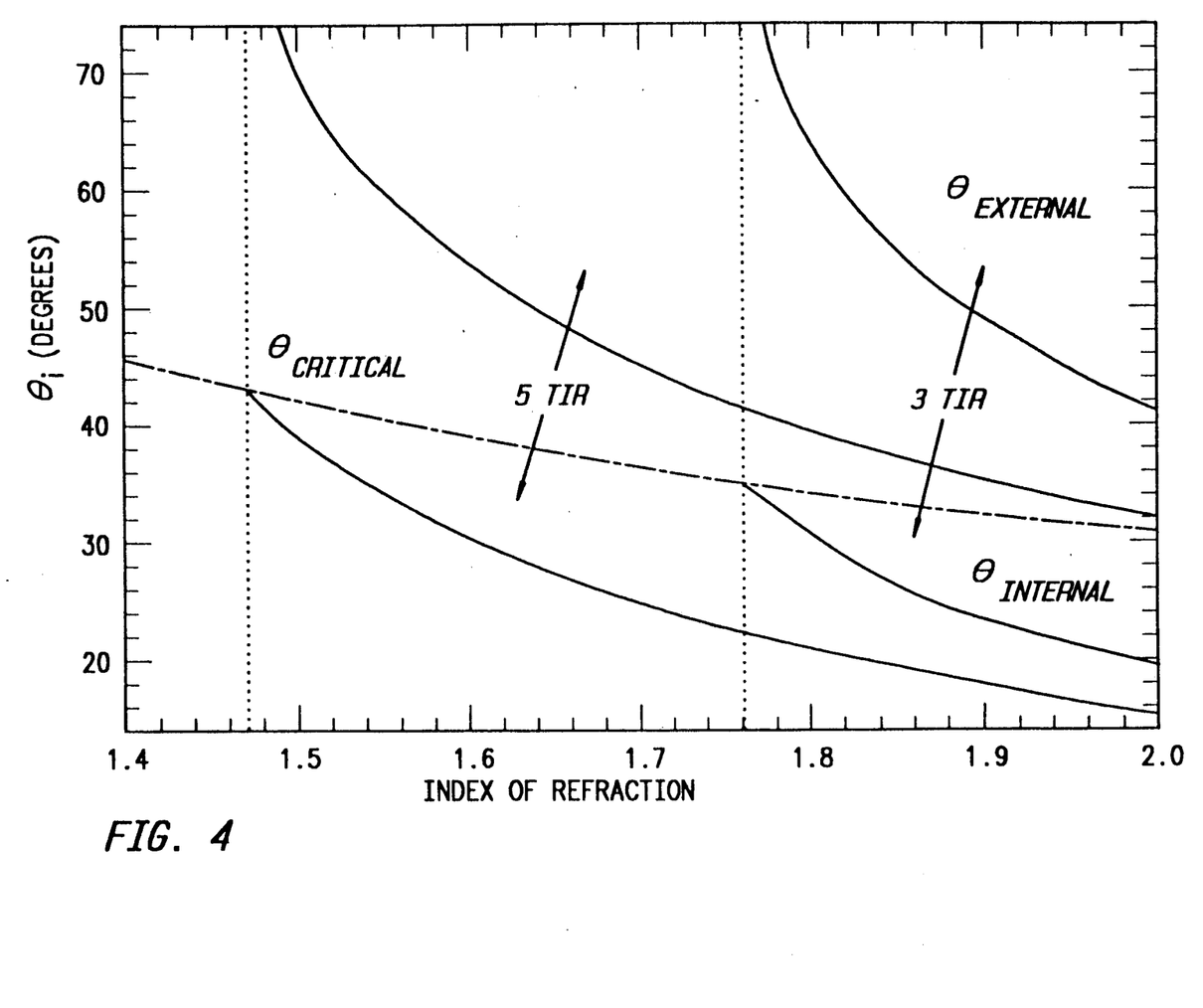
FIG. 4 illustrates a plot of allowed angles of optimal design conditions (half-wave plate optical equivalents) consistent with the preferred embodiment.

Referring to FIG. 4, among the first issues considered in a monolithic NPRO design are the angle restrictions implied by the refractive index of the laser host material. Because of the need to satisfy the cumulative TIR differential phase shift constraint, there will in general be a lower bound on the allowed angle of incidence at the outcoupler which depends upon the number of TIR bounces and the index of refraction of the medium n. Conversely, an upper bound is provided by the restriction that this angle must be held to values which are less than the critical angle for TIR. This follows from the practical consideration that the angle of incidence of the pump beam cannot be allowed to become unreasonably large. (The pump beam angle approaches 90° as the internal angle nears $\theta_{critical}$.) The upper bound is independent of the number of TIRs since the critical angle is solely a function of the refractive index of the laser medium relative to that of the ambient environment.

A range of values is therefore anticipated for the internal angle of incidence at the outcoupler 32, $\theta_{internal}$, (equivalent to $\theta_A$ in FIGS. 1a and 3a) within which optimal NPRO designs can be found for an arbitrary value of n. This result is of course subject to the restriction that n must exceed a minimum value which is determined by the maximum possible differential phase shift of a single TIR and the total number of TIR bounces. In the limit of small deviations from a planar geometry (small values of the angle $\beta$ in FIGS. 1 and 3) the lower bound can be determined through iterative calculations of the cumulative differential phase shift subject to the requirement that the incident angles remain consistent with closed-path NPRO geometries. FIG. 4 presents the results of such calculations, graphically illustrating the allowed range of $\theta_{internal}$ for 3-TIR and 5-TIR systems as functions of the refractive index.

In FIG. 4, two sets of shaded regions appear. The lower regions show the allowed values of $\theta_{internal}$ for optimal NPRO designs which include either 3 (dark shading) or 5 (light shading) TIRs. These two regions are both bounded from above by the dot-dashed curve which represents the critical angle limit. The upper pair of regions describe the corresponding range of refracted external angles for the laser output beam as determined from Snell's law. The upper bound for these regions is limited by $\theta_{external} \rightarrow 90°$ as $\theta_{internal} \rightarrow \theta_{critical}$. If dispersion in the refractive index of the laser host material is negligible, these upper ranges also indicate the allowed angles of incidence for the pump beam.

The allowed range of $\theta_{external}$ often poses some of the most important restrictions in the design process. The angles available for external access to the device may be subject to overriding constraints from issues such as packaging or interfacing with external devices (including the pump source). Furthermore, refraction across the input/output coupler 22 or 32 interface subjects both the pump beam and the laser output to an anamorphic compression or expansion that modifies the beam shape. The net effect is to transform beam cross sections from nominally circular to elliptical or vice-versa. The degree of eccentricity imposed is determined by the ratio of the cosines of $\theta_{external}$ and $\theta_{internal}$. This ratio grows dramatically as $\theta_{internal} \rightarrow \theta_{critical}$. Specific applications may impose beam-quality constraints that will tolerate only a limited degree of eccentricity and further restrict the allowed angles.

Several conclusions regarding the role of the refractive index of the laser host can be drawn from an examination of FIG. 4. The most obvious result is that the lower limit of n which permits optimal NPRO designs in 3-TIR systems is in fact somewhat greater than the value of root 3, as suggested in the cross referenced U.S. patent application for a MONOLITHIC NONPLANAR RING OSCILLATOR AND METHOD. The actual cutoff is set by the critical angle constraint and is given by n=1.7616, as indicated by the right-hand vertical dotted line. This limit excludes a large number of common optical materials from consideration, including in particular most standard laser glasses where n=1.5. Increasing the number of TIRs to 4 pushes this limit down to n=1.5619 (not shown); 5 TIRs allow optimal designs for n=1.4710, as shown by the left-hand dotted line. Further increasing the number of TIRs will continue to reduce this limit, although the reduction is steadily less pronounced. (e.g., for 6 TIRs the limit is n = 1.4214, for 7 TIRs n= 1.3912, etc.).

The increased design freedom offered by 5-TIR systems over 3-TIR systems is also well-illustrated in FIG. 4, even for refractive indices which are greater than the 3-TIR limit. For example, for Nd:YAG with n≈1.82 at 1.064 nm, the allowed range of values for the angle of incidence at the coupler in a 3-TIR system is $28.14° \geq \theta_{internal} \geq 33.33°$ and the minimum output beam angle is $\theta_{external} \approx 59.13°$. In a 5-TIR geometry, the upper bound on $\theta_{internal}$ remains the same as the 3-TIR case since this limit is set by $\theta_{critical}$ while the lower bound is significantly reduced. The 5-TIR minima at n≈1.82 are $\theta_{internal} \approx 19.83°$ and $\theta_{external} \approx 38.12°$.

The decrease in astigmatism and the corresponding improvement in beam quality represented by the 5-TIR limits for n>1.7616 is also significant. Reducing astigmatism simplifies the problem of achieving good overlap between the pump beam and the fundamental (TEM$_{00}$) cavity mode of the NPRO, one of the crucial issues in determining whether or not single-mode lasing occurs. Improved beam quality also reduces the complexity (and therefore the cost) of any additional optics required to transform the output beam into an arbitrary profile or provide a desired focus.

NPROs designed such that $\theta_{internal}$ equals the limiting value determined by the phase shift constraint (the solid curves which describe the lower bounds of the shaded regions) can be termed minimal astigmatism designs. For such designs the values of the TIR angles are forced to converge to equal values in the limit that the out-of-plane fold angle $\beta \rightarrow 0$. The magnitude of the angle of incidence at the TIR facets, $\theta_{complement}$, is determined solely by the number of bounces and the limiting value of $\theta_{internal}$. In the symmetric 4-bounce system $\theta_{complement} = (180° - \theta_{internal})/3$; in the 6-bounce system $\theta_{complement} = (360° - \theta_{internal})/5$.

CHARACTERISTIC ASPECT RATIOS

Figure 5:
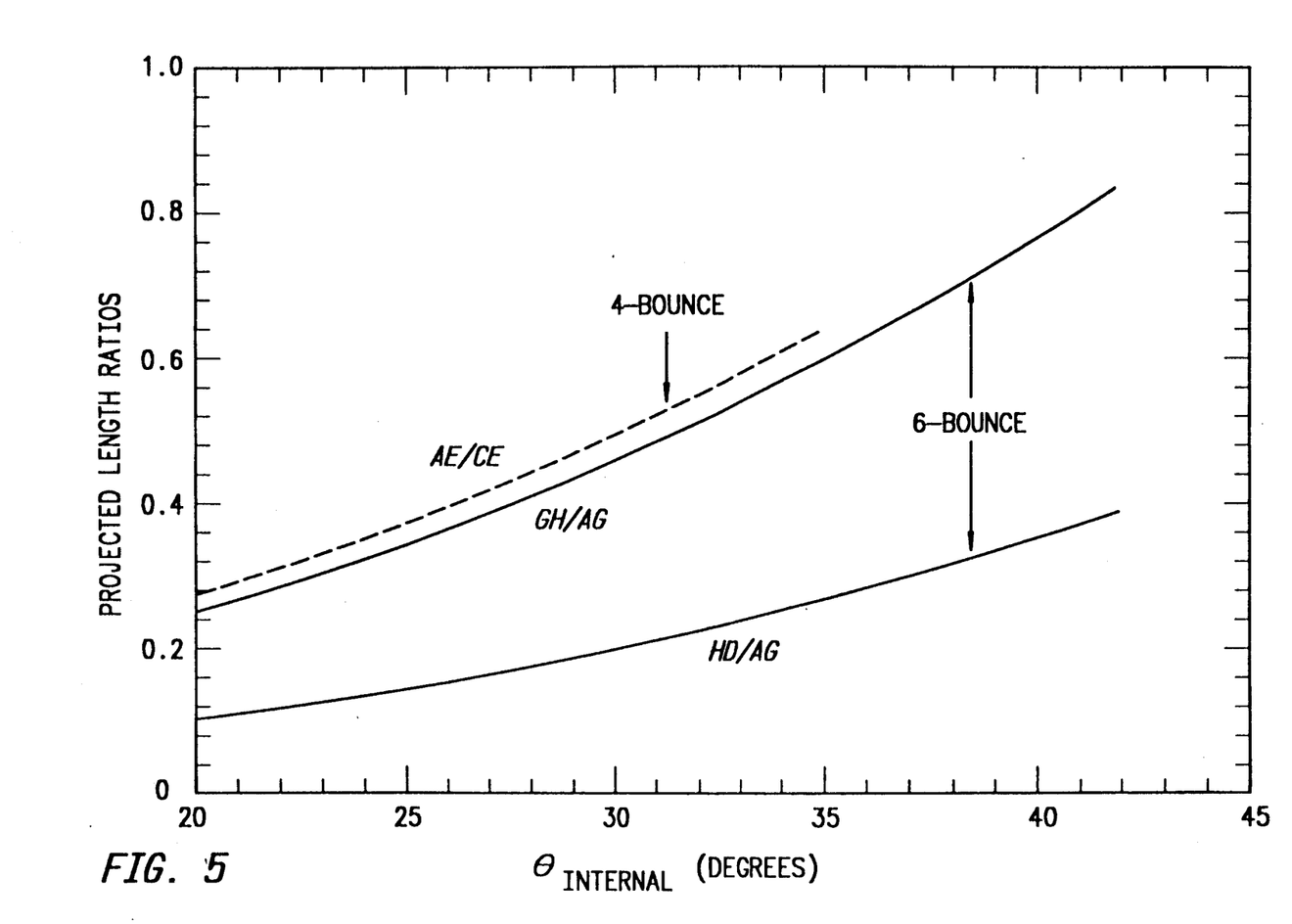
FIG. 5 illustrates a plot of aspect ratios of characteristic length projections for 4-bounce (3 TIR) and 6-bounce (5-TIR) NPROs.

In the minimal astigmatism limit the aspect ratios (relative dimensions of the characteristic lengths) of a minimum area NPRO are uniquely defined as a function of $\theta_{internal}$ alone. This statement is easily justified by noting that in this case all internal angles are known. The relative proportions and therefore the basic optical path outlines are unambiguously determined; the actual dimensions remain to be specified. Referring to FIG. 5, a plot of calculated aspect ratio values for both the 4-bounce and 6-bounce designs is provided, using nomenclature consistent with the optical path outlines illustrated in FIGS. 1 and 3.

In FIG. 5, two sets of aspect ratios are plotted. The choice of characteristic lengths in each set is rather arbitrary. The ratios shown are referenced to lengths which are useful in defining the effective resonator length projection in the intended direction of the applied magnetic field, $L_{eff}$. In the case of 4-bounce systems, the ratio of triangle heights used previously to specify the basic geometry (AE/CE) provides a convenient quantity. As $\beta \rightarrow 0$, $L_{eff} = 2 \cdot (AE + CE)$. (The factor of 2 accounts for the implied double-pass of the magnetic field in one complete transit of the ring path, so that the V.B.$L_{eff}$ product represents the net Faraday rotation per round trip.) Similarly, for 6-bounce designs the ratio of triangle heights (HD/AG) and the ratio between their base separation and the larger triangle height (GH/AG) are also convenient. In the 6-bounce case as $\beta \rightarrow 0$, $L_{eff} = 2 \cdot (AG + GH + HD)$.

Conservative design practice dictates choosing a value for $\theta_{internal}$ which is somewhat greater (~1°) than the minimum for a given value of n. The aspect ratios of the projected characteristic lengths of the NPRO in such slightly non-critical designs will differ somewhat from the limiting-case values plotted in FIG. 5. In particular, the TIR angles can no longer exactly equal each other and simultaneously satisfy the differential phase shift constraint. Nonetheless, the minimal astigmatism aspect ratios provide a good starting point when searching for optimal designs subject to secondary constraints.

An important advantage is retained by not straying too far from the minimal astigmatism limit when choosing TIR angles. When $\theta_{internal}$ is close to the minimum allowed value, the individual phase shifts of each TIR bounce are approximately equal. In this case an angular error in one TIR induces a corresponding phase shift error which is (to first order) offset by complementary errors in the other TIRs. Satisfaction of the phase shift constraint is thus stable against small perturbations in facet angles. Manufacturing tolerances will be the most forgiving under these circumstances.

NONPLANAR ANGLE CONSIDERATIONS

A secondary complication arises when considering designs in which $\theta_{internal}$ exceeds the minimum astigmatism value. In the 4-bounce case, there will in general be two sets of angles for the TIRs which satisfy the crucial phase constraint when $\theta_{internal}$ falls within the lower darkshaded area of FIG. 4. These two sets can be shown to require different nominal values of the nonplanar fold angle and can be referred to as "high-$\beta$" and "low-$\beta$" optimal solutions. The high-$\beta$ value will be larger than $\beta$ in the minimal astigmatism case while the low-$\beta$ value will be smaller than the limiting-case value. In each case the magnitude of deviation of $\beta$ from the minimum astigmatism value tends to increase as the deviation of $\theta_{internal}$ from the lower bound increases.

A similar situation occurs in 6-bounce NPROs if one of the TIR angles is held fixed at some nominal value while the other two TIR values are allowed to vary while searching for optimal solutions. In this case a best configuration can be determined by seeking to minimize the mean deviation between all three angles, maximizing the stability of satisfying the differential phase-constraint against facet angle errors. In practice this occurs for high-$\beta$ cases in which the specified TIR value is slightly greater than the minimum astigmatism limit, $\theta_{complement}$.

High-$\beta$ cases offer several other potential advantages over their low-$\beta$ counterparts. Because of the small departure from planarity of typical NPRO designs, the actual magnitude of $\beta$ in either case is often very small and can be difficult to manufacture with sufficient precision. High-$\beta$ values may, therefore, offer the better choice from the point-of-view of fabrication. The ring path in high-$\beta$ designs more-closely approximates a circular shape than the somewhat more-elongated low-$\beta$ solutions, a potentially interesting feature in laser gyroscope applications. High-$\beta$ designs tend to be slightly shorter than low-$\beta$ designs which produce identical optical equivalents and, therefore, are actually more efficient at utilizing Faraday rotation.

The most important steps remaining in the design process are: i) choosing the final device dimensions; ii) specifying the outcoupler coating characteristics; and iii) precisely determining the magnitude of geometric rotation required to provide proper optical equivalents. The interrelationship between these factors suggests that all three should be considered concurrently.

Acceptable device dimensions depend primarily upon the desired threshold pump power level and/or slope efficiency. Specification of either of these characteristics not only limits the maximum dimensions of the device but also has a major impact on the desired coating characteristics. Low pump thresholds consistent with good-beam-quality diodelaser pumping require small laser mode volumes and low outcoupling fractions. Small mode volumes in monolithic devices are associated with small overall dimensions, implying that the net Faraday rotation and, therefore, the magnitude of the geometric rotation will be severely limited. Low outcoupling fractions imply that the reflectivity of the outcoupler coating in the preferred eigenstate (generally the polarization state perpendicular to the plane of incidence at the outcoupler) must approach unity.

Short optical path lengths are desirable for the promotion of single-axial-mode lasing. The separation in frequency between adjacent axial modes is inversely proportional to the ring perimeter length. Larger mode separations bias the laser toward single-mode operation by allowing larger differences to occur between different values of the gain characteristic of a particular laser medium at the discrete frequencies corresponding to successive cavity modes. If the gain distribution of a lasing transition is sufficiently narrow in frequency (as is often the case in crystalline laser hosts) then single-axial axial mode lasing can be obtained simply by reducing the cavity length to sub-millimeter dimensions. Similarly, short-perimeter NPROs are more likely to operate as single-frequency devices and the minimum loss difference required should be reduced.

As noted earlier, the optimal reflectance characteristics of the outcoupler coating are a function of the available Faraday rotation. Low values of the design value for the V.B.L$_{eff}$ product require $p \equiv r_p/r_s \rightarrow 1$. Fortunately, this requirement is not incompatible with the simultaneous need for $r_s \rightarrow 1$; these properties are to some extent coupled in typical optical coatings. As the average reflectance of a multi-layer dielectric stack increases with greater numbers of layers, the difference between $r_s$ and $r_p$ decreases and the value of their ratio p correspondingly approaches unity. However, note that it is not in general possible to independently specify $r_s$ and p while restricting the differential phase shift of the coating to an arbitrary value. A designer must balance the intended final device dimensions with the availability and expense of desired coating characteristics.

From a practical viewpoint, specification of the actual device dimensions and precise facet angles is a process which is sufficiently complicated to demand the assistance of a computer. The problem can be posed as a constrained multi-dimensional search for maximum values of an appropriately defined figure-of-merit. Since minimal astigmatism designs are already close to optimal values, except for the specification of the magnitude of geometric rotation, convergence to optimal solutions can be rapid if a minimal astigmatism case is used as a starting point.

Because these cases implicitly ignore geometric rotation ($\beta \rightarrow 0$), a small value of $\beta$ must be specified to provide a non-zero initial loss difference. Usually a value somewhat larger than the Faraday rotation will ultimately be found to be necessary, so the V.B.L$_{eff}$ product should be estimated first. This requires specification of approximate device dimensions. Given reasonable values of available magnetic field strengths and a known value for the Verdet constant of the laser host, the net Faraday rotation (and thus the proper magnitude of $\beta$) can be obtained without difficulty. An appropriate optical coating based on these factors may then be selected, and a computer-aided search for the exact details of an optimal geometry initiated.

Computationally, the problem consists of (1) calculating the reduced Jones matrices corresponding to both propagation directions around the ring, (2) extracting the eigenvalues to determine the polarization eigenstates, (3) comparing the loss difference and effective outcoupling to their anticipated optimal values. By defining the ratio of the loss difference to the outcoupling as an appropriate figure-of-merit subject to maximization, small perturbations to the initial design can be used to seek out a geometry which ultimately provides the optimal optical equivalents for acceptable values of p and $\beta$.

One important consideration in a computer-assisted design process is the choice of search variables. As discussed above, the basic material and coating properties can be assumed to be fixed by other considerations, leaving only geometric quantities as candidate variables. If the primary angle of incidence and effective overall device length are also taken as fixed, there will still be 2 free parameters in symmetric 4-bounce cases and 4 free parameters for analogous 6-bounce designs.

Two additional constraints prove to be particularly appropriate in reducing the number of free parameters for the 6-bounce case. As suggested earlier, by minimizing the mean deviation of the TIR angles the net differential phase shift can be made as insensitive to angular errors as possible. By also requiring that the points of reflection from the rear TIR facets be well-centered, the effective number of free parameters is reduced from 4 to 2. In both 4-bounce and 6-bounce designs the rear triangle height (CE or HD, respectively) and the nonplanar bend angle $\beta$ are good choices for these variables.

Figure 6:
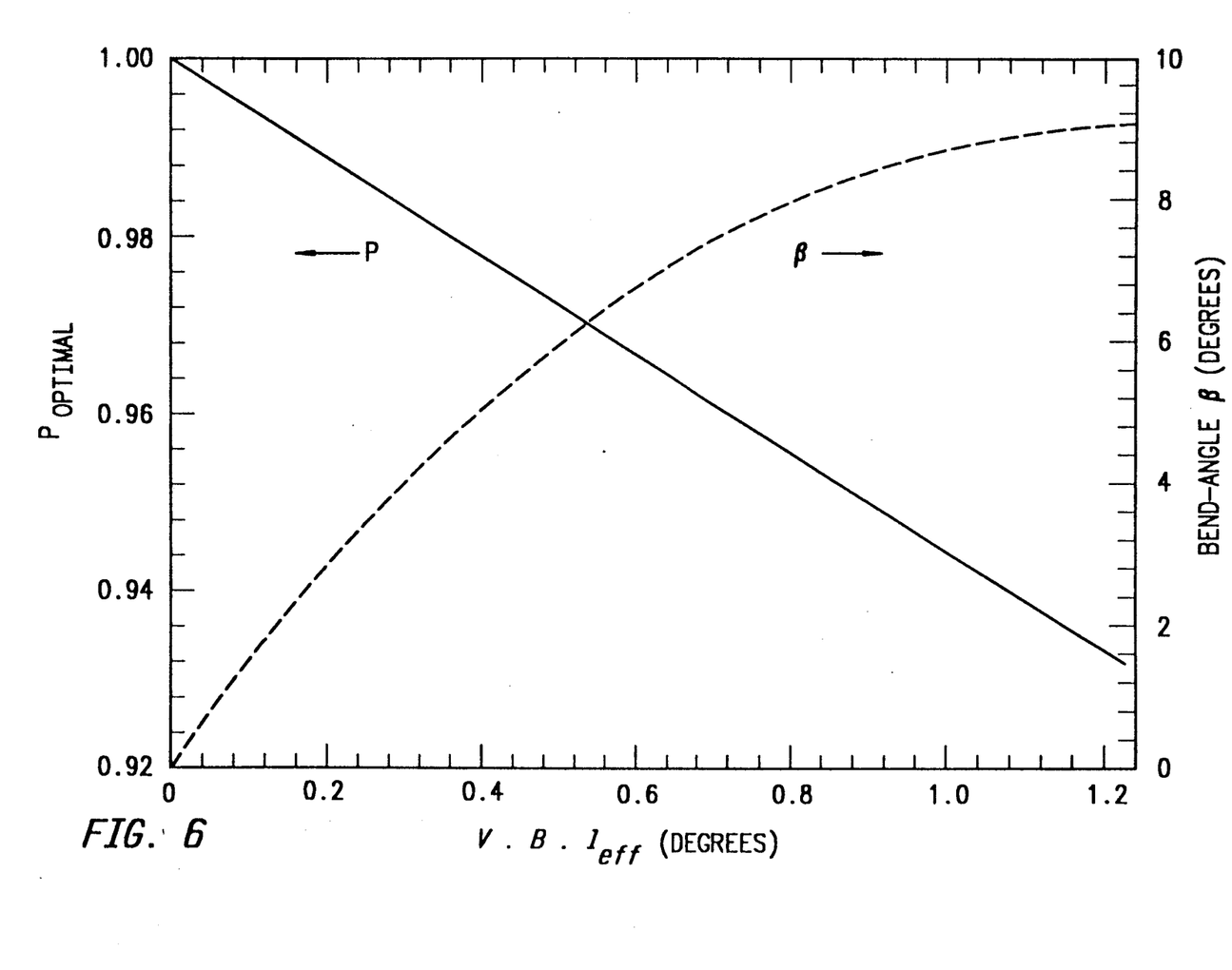
FIG. 6 illustrates variations of the optimal partial polarizer strength p optimal (solid line) and nonplanar fold angle $\beta$ (dashed line) with total nonreciprocal rotation in a 5-TIR NPRO consistent with the preferred embodiment.

Referring to FIG. 6, variation in the optimum values of p (solid line) and $\beta$ (dashed line) as functions of the net Faraday rotation for the case of n=1.53, $\theta_A$=37° and $\theta_B$=65° are displayed. These curves were produced by searching for optimal high-$\beta$ solutions to a series of discrete values of the V.B.$L_{eff}$ product which spanned a realistically achievable range. Similar curves can be generated for other choices of the fixed design parameters (n and $\theta_i$), but once the computational machinery has been developed to find an arbitrary optimal design it is usually simpler to consider specific cases using an appropriate minimal astigmatism design as the starting point. The plotted curves are intended to provide an indication of typical trends in the optimal values of p and $\beta$ for a fixed index of refraction and specific incident angle at the outcoupler.

Note that the optimal partial polarizer strength is essentially a linear function of the available Faraday rotation, while the nonplanar bend angle (and associated geometric rotation) is not. The behavior of $\beta$ indicates that the ratio of the geometric and Faraday rotations actually decreases with increasing V.B.$L_{eff}$. The roll-over in $\beta$ is particularly interesting. As the Faraday rotation is increased to somewhat larger values than those plotted in FIG. 6, eventually no value of $\beta$ will provide optical equivalents consistent with optimal designs. This limit is reached as $d\beta/d(V.B.L_{eff}) \rightarrow 0$. The Faraday rotation required to reach this limit can be remarkably small, in this case only slightly greater than 1°.

Figure 7:
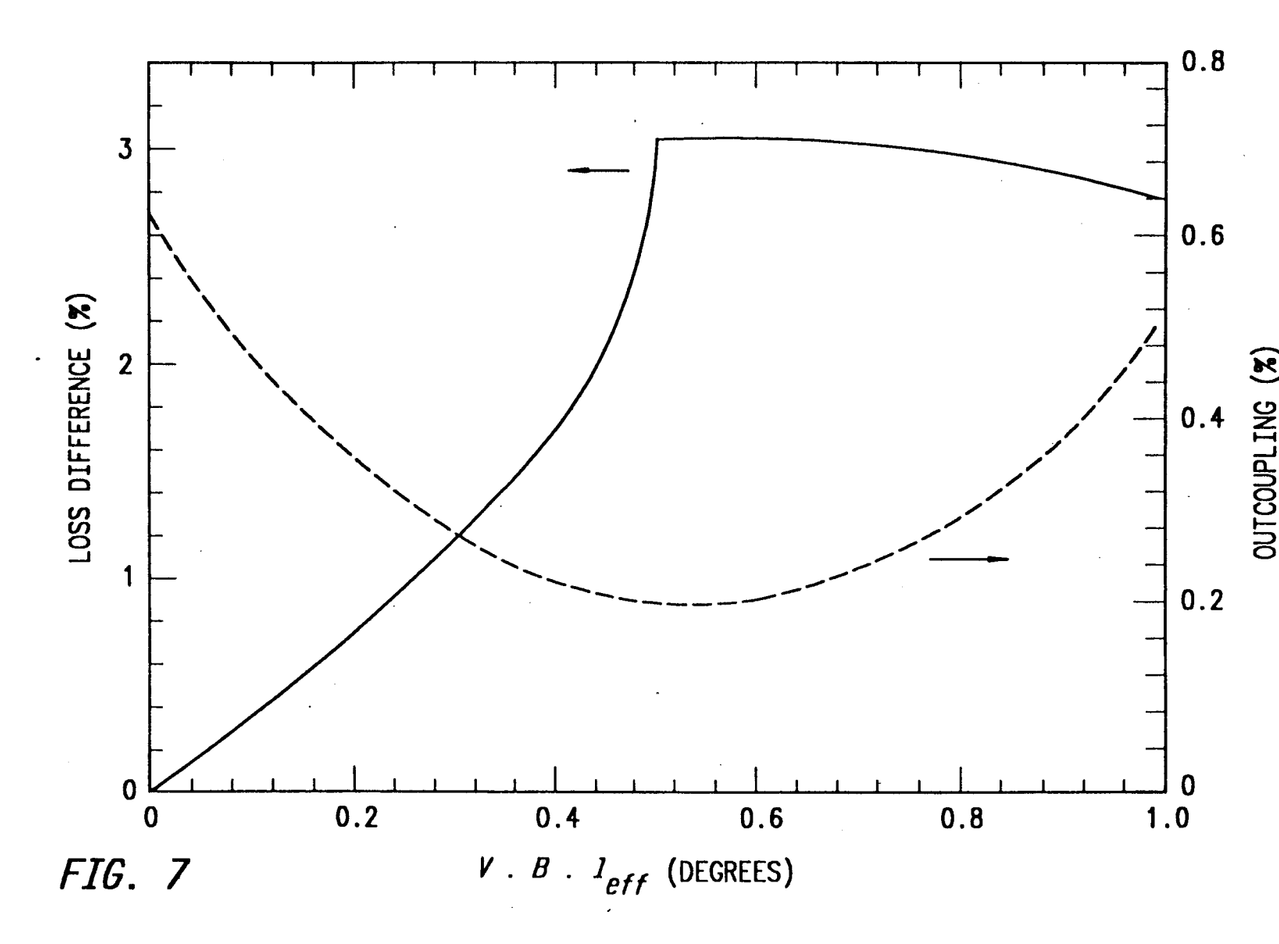
FIG. 7 illustrates variations of the net percentage loss difference (solid line) and the outcoupling percentage (dashed line) with total nonreciprocal rotation for a six-bounce Nd:glass NPRO in accordance with the preferred embodiment.
Figure 8A:
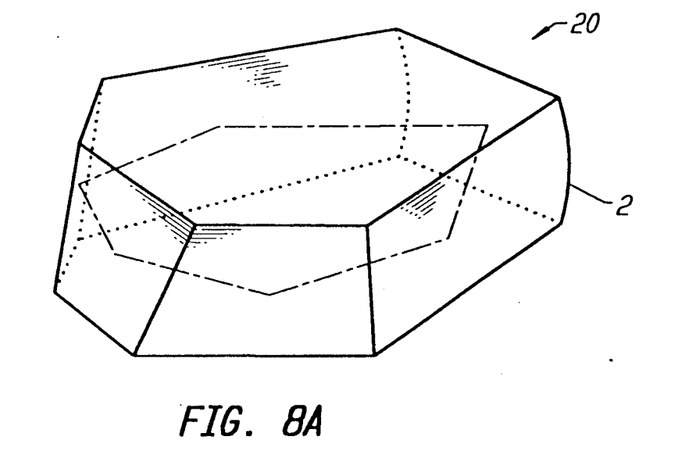
FIGS. 8a-d illustrate a perspective, top, side and front view, respectively, of a monolithic Nd:glass NPRO in accordance with the preferred embodiment.
Figure 8B:
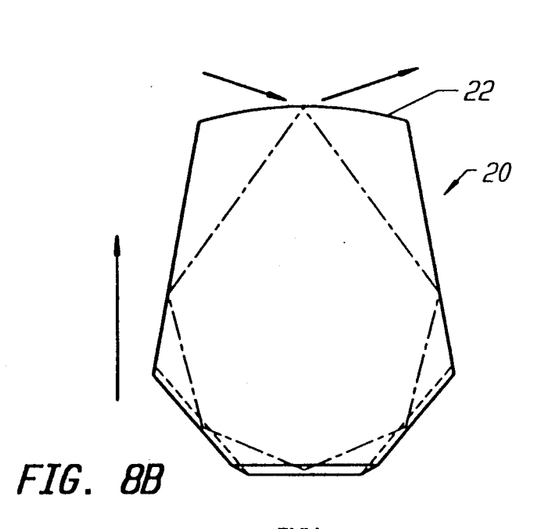
Figure 8C:
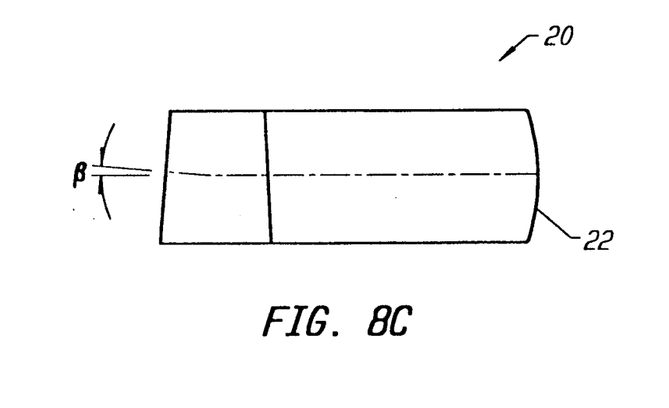
Figure 8D:
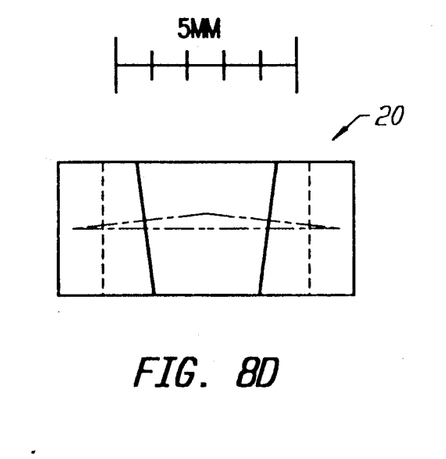

Referring to FIG. 7, the theoretical variation in the loss difference (solid line) and the effective outcoupling (dashed line) for a representative optimized 6-bounce Nd:glass NPRO design are plotted. (In this case n=1.5162, $\theta_A$=38°, $\theta_B$=65°, $\beta$=5.05°, p=0.969, $r_s$=0.999, corresponding to several prototype devices which have been successfully fabricated.) In generating these curves the refractive index, geometry and coating characteristics were held fixed while only the net Faraday rotation was varied. These curves therefore indicate the NPRO behavior expected as a function of varying the applied B-field strength.

A maximum loss difference of ~3% is obtained in this design which is consistent with a partial polarizer strength of p$\approx$(1.00−0.03)=0.97. An additional consistency check is provided by the minimum outcoupling of 0.2%. This implies that the amplitude reflectance of the preferred eigenstate is given by $|r_s| \approx (1-0.002)^{0.5} \approx 0.999$. The V B.$L_{eff}$ product which maximizes the loss difference (net Faraday rotation ~0.54°) dictates that for V=1.1×10$^{-3}$ rad/mm-Tesla (the measured value for 0.55% Nd-doped LHG-8) and a nominal value of B=0.5 Tesla, the maximum dimension of the optical path would be given by $L_{eff}/2$=AG+GH+HF$\approx$9 mm. Alternatively, reducing overall dimensions while maintaining the aspect ratios and angles of the device would require an increase in the applied B-field (maintaining the net Faraday rotation) to reproduce these curves.

NON-OPTIMAL DESIGNS

The preceding discussion has emphasized design characteristics which provide optimal NPRO designs. These designs are intended to provide the largest loss difference and greatest resistance to external feedback possible given a limited amount of Faraday rotation. The actual magnitude of the loss difference required to achieve unidirectional single-mode lasing cannot be determined from a priori calculations such as those used to optimize the NPRO geometry, but must instead be found from experiment.

As noted previously, a loss difference as small as 0.01% has been conservatively estimated to be sufficient to induce unidirectional lasing in Nd:YAG. The behavior of the 6-bounce NPROs fabricated from LHG-8 suggests that the minimum loss difference required for glass is even lower. Devices which most closely match the design angle specifications have demonstrated unidirectional lasing with B-field strengths as low as 30 Gauss. From measured values of the actual coating phase shift, this low magnetic field implies that the minimum required loss difference was <0.001% (<10 ppm).

This experimental result indicates that even designs which deviate significantly from those defined here as optimal may demonstrate unidirectional (and potentially single-mode) lasing. As far as actual devices are concerned, two important implications arise. First, the angular tolerances of optimal designs can be specified fairly loosely. Deviations of as much as ±0.5° in individual included angles of the ring path have been shown to require only a modest increase in the required magnetic field strength (from <30 G to ~150 G, a value still well within the range of inexpensive permanent magnets). Second, if additional design constraints become important, intentionally nonoptimal designs which attain the minimum demonstrated loss difference can still be expected to work.

ND:GLASS NPRO

Referring to FIGS. 8a—d, a modified NPRO 70 in accordance with the preferred embodiment is shown in which the nonplanar ring light path is defined by five TIR bounces and one reflection from a coated output-coupling face 22. The laser material is a standard phosphate glass (Hoya LHG-8, 0.55% Nd doping) with an index of refraction $n \approx 1.5162$ at the lasing wavelength of 1.054 nm. The low-angle out-of-plane bounce (labeled $\beta$ in the side view) causes a reciprocal polarization rotation for light traveling along the optical path indicated by the dot-dashed lines. Non-reciprocal Faraday rotation is induced by applying a magnetic field parallel to the long dimension of the ring as shown by the labeled arrow. These two effects combine with the TIR phase shifts to provide a direction-dependent net polarization rotation. The multi-layer dielectric coating on the output coupling face 52 acts as a partial polarizer to convert the alternate polarization rotations into a differential loss, leading to unidirectional oscillation.

The design value of the output coupling is $\sim 0.2\%$ for the preferred eigenmode. By combining this low out-coupling fraction with the small mode volume associated with the indicated dimensions of the resonator, a sufficiently low pump-threshold level is obtained for diode-laser pumping. The NPRO device 20 has been operated using a broadband cw dye laser tuned to $\sim 585$ nm as the pump source. The observed laser oscillation threshold at this wavelength is $<35$mW, consistent with fixed total cavity losses of 0.60–0.7%. The laser has also been successfully operated when pumped by a semiconductor diode array with a nominal wavelength of 802 nm. Unidirectional lasing in a single transverse and axial mode is obtained when the applied magnetic field strength exceeds 30 Gauss. This field strength is lower than the minimum value reported necessary for unidirectional operation in Nd:YAG NPRO designs. This result suggests that the differential loss required to achieve unidirectional oscillation in a glass NPRO is $<10$ ppm. The lasing direction can be reversed simply by changing the orientation of the magnetic field.

It should further be apparent to those skilled in the art that various changes in form and details of the invention as shown and described may be made. It is intended that such changes be included within the spirit and scope of the claims appended hereto.

We claim:

1. A monolithic nonplanar ring laser resonator constructed from a single piece of optically isotropic solid state laser material characterized by a non-zero Verdet constant and several facets which determine a closed internal nonplanar optical path including six points of reflection for propagating light around said internal nonplanar optical path, said optical path being symmetrical about a plane which passes between the two most widely separated points of reflection.

2. The laser resonator of claim 1 wherein said six points of reflection include:
   five total internal reflections within the laser host material; and
   one coupler reflection which explicitly avoids total internal reflection for admitting pump energy into said resonator and for coupling laser emission out of said resonator.

3. The laser resonator as claimed in claim 2 wherein one of said six points of reflection is displaced from the plane which all other reflections share in common for inducing image rotation and an associated reciprocal polarization rotation for light propagating around said internal nonplanar optical path.

4. The laser resonator as claimed in claim 3 further includes:
   means for applying a magnetic field substantially aligned with a major axis of the resonator for inducing non-reciprocal polarization rotation, said non-reciprocal polarization rotation combining with total internal reflection differential phase shifts and said associated reciprocal polarization rotation to produce a propagation direction dependent degree of net polarization rotation.

5. The laser resonator as claimed in claim 4 wherein said coupler reflection includes a multi-layered dielectric coating for providing partial transmission of useful laser output and for providing partial polarization to discriminate between differentially rotated internal polarization states.

6. The laser resonator as claimed in claim 1 including an external laser source for providing a laser pumping source of suitable wavelength and appropriate focusing optics for efficiently end-pumping said monolithic nonplanar ring laser.

7. A laser resonator as claimed in claim 6 wherein the refractive index of the laser host material is greater than 1.471.

8. A laser resonator as claimed in claim 7 wherein said facets are angled to reduce output beam astigmatism and eccentricity.

9. A laser resonator as claimed in claim 7 wherein said facets are angled to improve mode overlap between a fundamental laser mode and said laser source pump beam and promote fundamental transverse mode lasing.

10. A laser resonator as claimed in claim 7 wherein the laser host material is Neodymium-doped glass.

11. The laser resonator as claimed in claim 10 wherein said facets are angled for providing a net differential loss greater than 10 ppm for available magnetic field strengths to achieve unidirectional lasing in laser glass.

12. The laser resonator as claimed in claim 10 wherein said facets are angled for providing a net differential loss greater than 100 ppm for available magnetic field strengths to achieve unidirectional lasing in YAG.

13. The laser resonator as claimed in claim 10 wherein the refractive index is approximately 1.52, the Verdet constant is approximately $1.1 \times 10^{-3}$ rad/mm-.Telsa, the internal angle of incidence at said coupler reflection is approximately 38°, a first and fifth total internal reflection angles are approximately 65°, a second and fourth total internal reflection angles are approximately 61.7°, a third total internal reflection angle is approximately 68.6°, an out of plane tilt angle is approximately 5.05° and the overall length of said resonator is approximately 8.6 mm.

14. The laser resonator as claimed in claim 7 wherein the external laser source is a semiconductor diode laser.

15. The laser resonator as claimed in claim 7 wherein unidirectional single frequency lasing is obtained when said applied magnetic field strength exceeds approximately 30 Gauss.

16. An Nd:glass monolithic nonplanar ring oscillator having an optically isotropic solid state laser body for propagating laser radiation about a nonplanar ring path internal to said laser body and a coupler for input of pmp radiation and output of a portion of said laser radiation from said laser body, comprising:
   means for propagating said laser radiation about said ring light path so that said light ring path comprises six reflections, said six reflections including five total internal reflections and one reflection at said coupler, said six reflection nonplanar ring light path being formed by the geometry of said laser body, said laser body being made out of Nd:glass and said light ring path being symmetric about a perpendicular plane intersecting said ring light path; and means for applying a magnetic field to said Nd:glass laser body, said magnetic field operating in conjunction with the geometry of said laser body and a partial polarizer means located in said ring light path to induce unidirectional traveling wave oscillation of said emitted laser radiation.

17. The Nd:glass monolithic nonplanar ring oscillator of claim 16 comprises means for inducing single frequency unidirectional traveling wave oscillation of said laser radiation including at least one of said reflections being at an oblique angle from a multi-layer dielectric output coupler and a partial polarization means for producing high loss in one direction of propagation and low loss in the other direction of propagation of said light in said symmetric ring path, said single frequency unidirectional oscillation being produced by the combined effects of said symmetric nonplanar ring path, the applied magnetic field and said partial polarizer means.

18. The Nd:glass monolithic nonplanar ring oscillator of claim 17 wherein the partial polarizer means are located at said coupler.

19. The Nd:glass monolithic nonplanar ring oscillator of claim 18 wherein said applied magnetic field exceeds 30 Gauss.

20. The Nd:glass monolithic nonplanar ring oscillator of claim 19 wherein the range of the angle of incidence at said coupler reflection for optimal performance of said Nd:glass laser body having said six reflections is 37°–41°.

21. A method for forming a monolithic nonplanar ring oscillator, comprising the steps of:
shaping a single piece of optically isotropic solid state laser material characterized by a non-zero Verdat constant to form a symmetrical nonplanar ring path having six internal points of reflection therein, providing a coupler on at least one of said six points of reflection, and impinging a pumping beam onto said coupler to excite ions in said solid state laser material, said ion excitation promoting laser oscillation about said nonplanar path having six internal points of reflection.

22. The method for a monolithic nonplanar ring oscillator of claim 21 further comprises the step of:
designating an optimal range of angle of incidence of said pumping beam to be between 30 and 39 degrees for said six reflection nonplanar ring when said laser material has an index of refraction of approximately 1.6.

23. The method for a monolithic nonplanar ring oscillator of claim 21 further comprises the step of:
designating an optimal range of angle of incidence of said pumping beam to be between 41 and 43 degrees for said six reflection nonplanar ring when said laser material has an index of refraction of approximately 1.48.

24. The method for a monolithic nonplanar ring oscillator of claim 21 further comprising the step of:
designating an optimal range of angle of incidence at said pumping beam to be between 25 and 27 degrees for said six reflection nonplanar ring when said laser material has an index of refraction of approximately 1.7.

25. The method for a monolithic nonplanar oscillator of claim 21 further comprises the step of:
designating an optimal range of angle of incidence of said pumping beam to be between 37 and 41 degrees for said six reflection nonplanar ring when said laser material has an index of refraction of approximately 1.5.

* * * * *